United States Patent [19]

Liebermann

[11] 4,134,998
[45] * Jan. 16, 1979

[54] SPRAY COOKING OF FOOD ARTICLES

[76] Inventor: Benno E. Liebermann, 2805 Lime Kiln La., Louisville, Ky. 40222

[*] Notice: The portion of the term of this patent subsequent to Sep. 13, 1994, has been disclaimed.

[21] Appl. No.: 805,964

[22] Filed: Jun. 13, 1977

Related U.S. Application Data

[62] Division of Ser. No. 707,318, Jul. 21, 1976, Pat. No. 4,047,476.

[51] Int. Cl.² .................. A23L 1/01; A23L 1/315
[52] U.S. Cl. .................. 426/438; 426/509; 426/523
[58] Field of Search .................. 426/92, 94, 96, 99, 426/100, 291, 293, 295, 296, 303, 307, 644, 652, 438, 441, 509, 523; 99/345, 346, 448, 450

[56] References Cited

U.S. PATENT DOCUMENTS

| | | | |
|---|---|---|---|
| 1,627,466 | 5/1927 | Smith | 426/296 |
| 2,011,247 | 8/1935 | Jourdan | 426/509 |
| 2,094,874 | 10/1937 | DeBack | 426/509 |
| 2,101,506 | 12/1937 | Morrow et al. | 426/441 |
| 2,122,021 | 6/1938 | Beckwith et al. | 426/509 X |
| 2,421,489 | 6/1947 | Elliott | 426/509 X |
| 3,169,069 | 2/1965 | Hanson et al. | 426/291 |

FOREIGN PATENT DOCUMENTS 621821  4/1949  United Kingdom.

*Primary Examiner*—Arthur L. Corbin
*Attorney, Agent, or Firm*—Harry B. O'Donnell, III

[57] ABSTRACT

Pressurized sprays of a liquid cooking medium are directed against food articles disposed on a support means until said articles are cooked. The sprays are directed simultaneously and aligned in a common plane with one another against opposed sides of each article while maintaining relative movement between the sprays and support means such that each article is clamped between the pressurized sprays and the entire surface of each article is contacted by the cooking medium.

7 Claims, 7 Drawing Figures

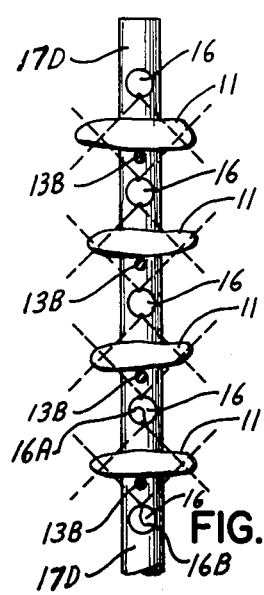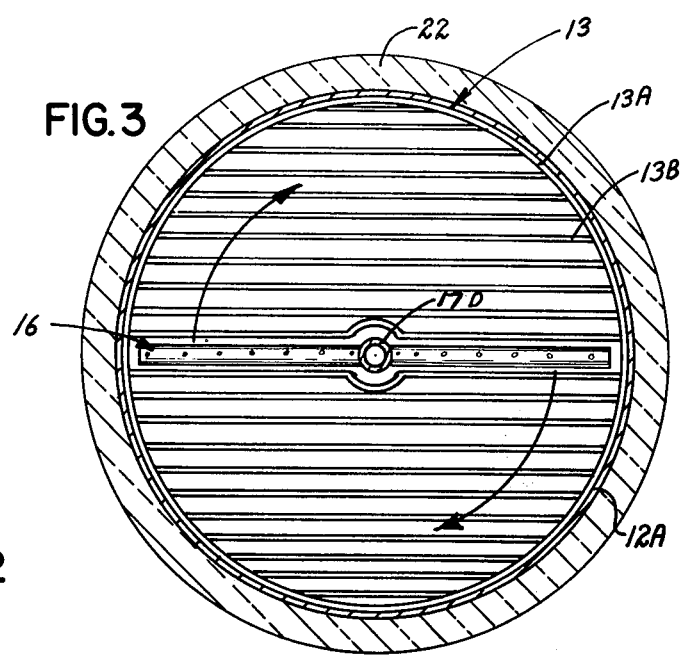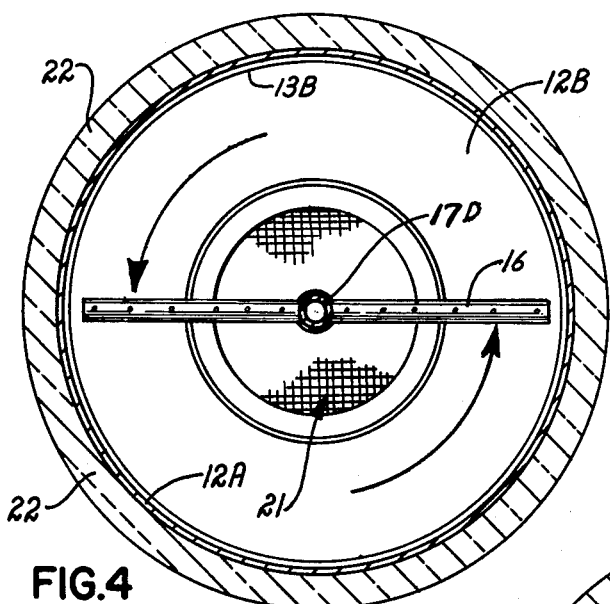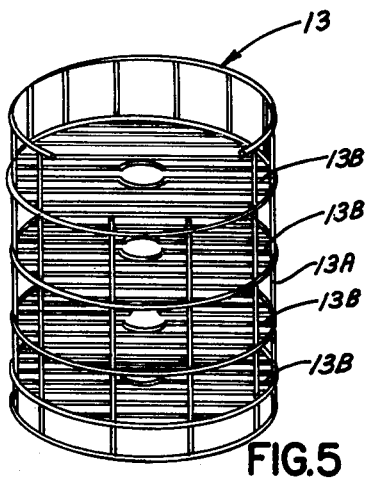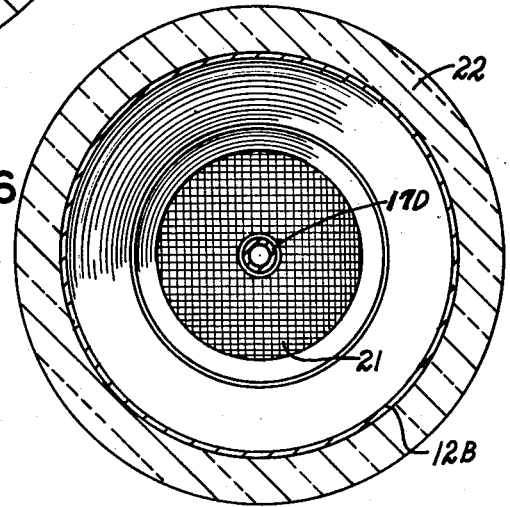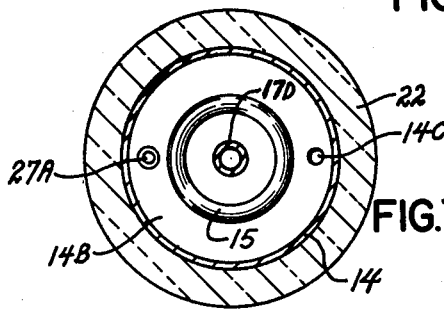

SPRAY COOKING OF FOOD ARTICLES

This is a division of Application Ser. No. 707,318, filed Jul. 21, 1976, now U.S. Pat. No. 4,047,476.

BACKGROUND OF THE INVENTION

This invention relates to apparatus for cooking food articles and, more particularly, to apparatus for cooking food articles with a heated cooking medium, such as water, vegetable oil, animal fat, shortening, and the like.

In the past, various prior-art apparatus have been provided for cooking food articles with a heated cooking medium. Most of these prior-art apparatus have required that the food articles to be cooked by them be at least partially immersed in the heated cooking medium. Many of these prior-art apparatus have required that the chamber of the apparatus in which the food articles are cooked by the cooking medium be a pressure vessel to enable cooking of the food articles at elevated pressures. Some of these prior-art apparatus utilize steam, rather than water, as the heated cooking medium and thus require input energy both for heating (1 BTU per 1° F. per 1 lb. of water) for first heating water to its boiling point (212° F.) and then providing the latent heat of vaporization (970 BTU per pound of 212° F. water) necessary to convert the 212° F. water into steam.

In this present era of mounting demands for energy and diminishing supplies thereof (and, consequently, rising costs therefor), it is, of course, highly desirable to reduce the energy required to achieve the cooking of food articles. And, the novel apparatus that is provided in accordance with the present invention does so to a vast degree, as compared with the aforenoted prior-art apparatus, while also reducing the time required to achieve cooking of the food articles. Furthermore, the need for a pressure chamber and the safety hazards and costs associated therewith are also eliminated. Still further, the amount of the coking medium that is required to cook the food articles can be greatly reduced, since they need not be immersed therein.

The novel apparatus that is provided in accordance with the present invention is somewhat similar to the old apparatus shown, described and claimed in British Pat. No. 621,821 which was published in the late 1940s, in that both apparatus cook food articles by directing a pressurized spray of heated liquid cooking medium onto the food articles that are supported in the cooking chamber, rather than by immersing them therein. However, the novel apparatus of the present invention is vastly improved over that of the aforenoted British Patent in that, among other things, the apparatus of the present invention comprises pump means that can spray the heated pressurized liquid cooking medium onto the food articles to be cooked thereby at pressures (in a range between 10 and 70 p.s.i.g.) much greater than the pressure (3 p.s.i.g.) specified for that purpose by the aforenoted British Patent. At least in part, these much higher pressure sprays of heated liquid cooking medium, which, in turn, greatly improve the heat transfer capability of the apparatus of the present invention over that of the prior-art apparatus of the aforenoted British Patent, are made possible by the unique alignment of the first and second sprayer means of the apparatus of the present invention in a common plane with one another such that the food articles which are supported within the cooking chamber are clamped between the opposed high pressure sprays discharged therefrom.

SUMMARY OF THE PRESENT INVENTION

The present invention provides novel apparatus for cooking food articles. Basically, the novel apparatus of the present invention comprises: a chamber; support means for locating food articles within the chamber with substantially all of their exterior surfaces being exposed; sump means having an inlet fluid-connected to the chamber for containing a liquid cooking medium; heater means for heating the liquid cooking medium contained in the sump; first sprayer means located within the chamber adjacent to a first side of the support means; second sprayer means located within the chamber adjacent to a second side of the support means that is opposite from the first side and being aligned in a common plane with the first sprayer means; and pump means fluid-connected to the sump means and to both of the sprayer means to admit to the chamber, through both of the sprayer means and onto the food articles supported thereon, a pressurized spray of liquid cooking medium in a pressure range between 10 and 70 p.s.i.g. that has been heated by the heater means but has not received any latent heat of vaporization therefrom so as to cause food articles supported on the support means to be clamped between the pressurized sprays respectively discharged by the first and second sprayer means and to be cooked thereby without being immersed therein.

The novel apparatus of the present invention is particularly adapted for cooking chicken parts, with the employed heated liquid cooking medium comprising water. However, it should be understood that it may also be utilized to cook a wide variety of other food articles, such as other meat parts, fish parts, whole vegetables and parts thereof, and the like, wherein water, vegetable oil, animal fats, shortening and the like are employed for the liquid cooking medium.

It is desirable, however, that both of the opposed first and second sprayer means of the novel apparatus of the present invention be fluid connected to its sump and pump means through a conduit member that is mounted for rotation relative to the cooking chamber and the support means for supporting the food articles therein and is interconnected to drive means for causing rotary movement thereof relative to the cooking chamber and the support means with the first and second sprayer means continuing to remain aligned in a common plane with one another.

Preferably, the novel apparatus of the present invention also includes control means connected to its heater means to control the temperature of the liquid cooking medium that is heated thereby to within ± 2° F. of the desired temperature to which the liquid cooking medium is to be heated and maintained by the heater means and to further control the temperature of that cooking medium such that no latent heat of vaporization is supplied thereby by the heater means.

It is further desirable that the novel apparatus of the present invention include temperature sensing means for determining the temperature of at least one of the food articles supported within its cooking chamber on its support means and other control means that are connected to that temperature sensing means and to its drive means and pump means to de-energize its drive means and pump means when a desired temperature is sensed by those sensing means.

Since no latent heat of vaporization need be supplied to the liquid cooking medium in employing the novel apparatus of the present invention, the energy savings realized by its use are manifest. For example, by employing heated water as its liquid cooking medium, rather than steam as was often required to produce a cooking time of an even longer duration with the aforenoted prior-art apparatus, the novel apparatus of the present invention can save the 970 BTU per pound that is required to change 212° F. water into steam. With the novel apparatus of the present invention, the only energy that is required to heat the water is the 1 BTU per 1° F. per pound thereof needed to raise it from its tap temperature (typically 62° F.) to the desired temperature for cooking the food articles (about 200° F. for chicken parts) and to maintain it there.

Additional savings, both in energy and in the required amount of liquid cooking medium can be realized by using the novel apparatus of the present invention as opposed to the aforenoted prior-art "immersion-type" apparatus, in that its cooking is accomplished by circulating and spraying only a small fraction of the amount of the liquid cooking medium that was required by these old prior-art "immersion-type" cooking apparatus. This, of course, greatly reduces the number of pounds of the cooking medium which must be heated and, consequently, also greatly reduces both the energy required for such heating and the cost of the required cooking medium itself. The savings permitted by the reduction in the amount of the required cooking medium is, in itself, of considerable value when vegetable oils, animal fats, and shortening are employed as the liquid cooking medium since there is also a mounting demand for them and diminishing supplies thereof (and, consequently, rising cost therefor).

Furthermore, when fat-containing food articles, such as chicken parts and other meat parts, comprise the food articles to be cooked, the high-pressure spraying of the liquid cooking medium onto the food articles that is permitted by the unique construction of the novel apparatus of the present invention actually serves to considerably increase the amounts of animal fats that are extracted from those food articles during the cooking process, when compared to the aforenoted prior-art apparatus.

BRIEF DESCRIPTION OF THE DRAWINGS

The present invention is illustrated in the accompanying drawings, wherein:

FIG. 2 is a somewhat enlarged fragmentary sectional view taken along line 2—2 of FIG. 1;

FIG. 3 is a fragmentary sectional view taken along line 3—3 of FIG. 1;

FIG. 4 is a fragmentary sectional view taken along line 4—4 of FIG. 1;

FIG. 5 is an elevational perspective view, showing in detail the construction of the support means (shown only schematically in FIG. 1) which are provided for locating food articles within the cooking chamber of the form of the apparatus of the present invention shown in FIG. 1;

FIG. 6 is a fragmentary sectional view taken along line 6—6 of FIG. 1; and

FIG. 7 is a fragmentary sectional view taken along line 7—7 of FIG. 1.

DETAILED DESCRIPTION

Figure 1:
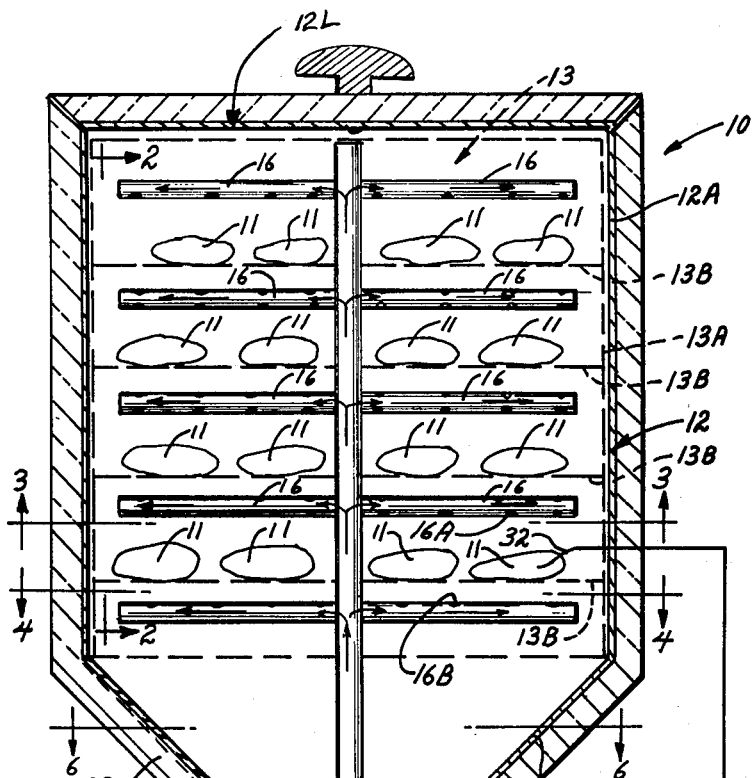
FIG. 1 is a somewhat schematic elevational view, partly in cross-section, and including a basic diagrammatic showing of the heater, pump, drive and control means therefor, of a presently preferred form of the novel apparatus that is provided in accordance with the present invention.
Figure 1:
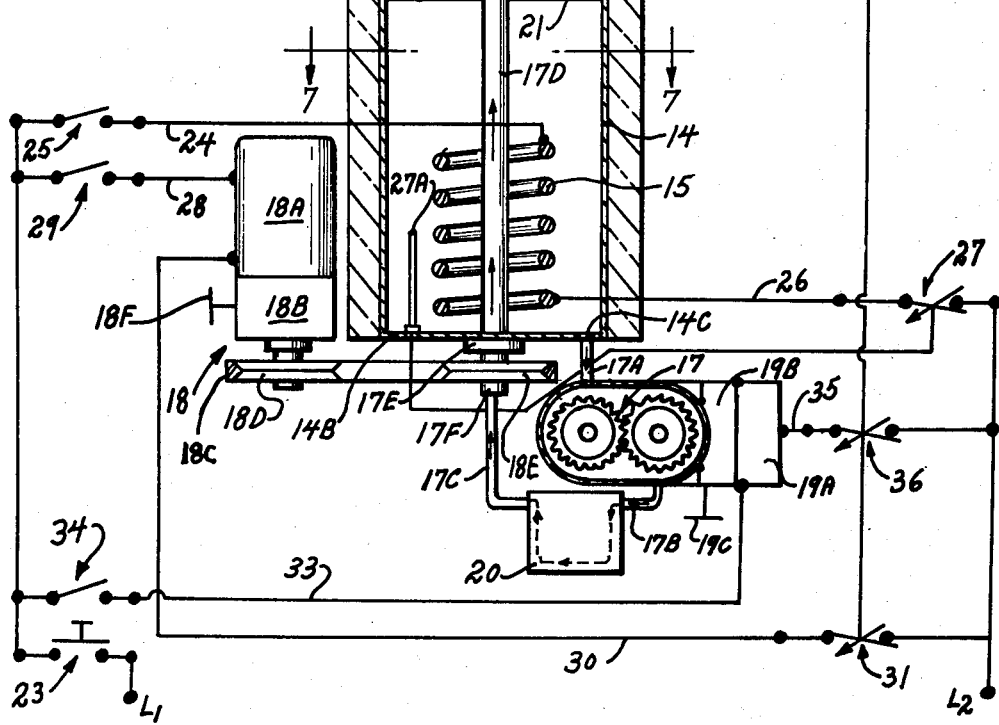

Turning now to the drawings and, more particularly, to FIGS. 1–7 thereof, there is illustrated a presently preferred embodiment of a novel apparatus 10 that is provided in accordance with the present invention for cooking food articles 11 with a heated cooking medium, such as water, vegetable oil, animal fat, shortening, and the like.

As illustrated, the apparatus 10 comprises: a chamber 12; support means 13 for locating the food articles 11 within that chamber 12 with substantially all of their exterior surfaces being exposed; sump means 14 having an inlet fluid-connected to the chamber 12 for containing a liquid cooking medium; heater means 14 for heating the liquid cooking medium contained within the sump 14; first sprayer means 16A located within the chamber 12 adjacent to a first side of the support means 13; second sprayer means 16B located within the chamber 12 adjacent to a second side of the support means 13 that is opposite from the first side and being aligned in a common plane with the first sprayer means 16A; pump means 17 fluid-connected by conduit members 17A, 17B, 17C and 17D to the sump means 14 and to both of the sprayer means 16A and 16B to admit to the chamber 12, through both of the sprayer means 16A and 16B and onto the food articles 11 supported thereon, a pressurized spray of liquid cooking medium in a pressure range between 10 and 70 p.s.i.g. that has been heated by the heater means 15 but has not received any latent heat of vaporization therefrom so as to cause the food articles 11 supported on the support means 13 to be clamped between the opposed pressurized sprays respectively discharged by the first and second sprayer means 16A and 16B and to be cooked thereby without being immersed therein.

The novel apparatus 10 of the present invention is particularly adapted for cooking chicken parts, with the employed heated liquid cooking medium comprising water. However, it should be understood that it may also be utilized to cook a wide variety of other food articles, such as other meat parts, fish parts, whole vegetables and parts thereof, and the like, wherein water, vegetable oil, animal fats, shortening and the like are employed for the liquid cooking medium. The food articles 11 can, under some conditions of operation of the apparatus 10, have their outer surfaces covered with a coating of a farinaceous material, such as breading, batter, and the like, which will be cooked (browned) by the apparatus 10.

As further shown in the drawings, the cooking chamber 12 of the apparatus 10 comprises a generally vertically-arranged container that is preferably made of stainless steel and includes a hollow cylindrical upper portion 12A which has an open top end for receiving the removable support means 13 for the food articles 11 and a hollow frusto-conical lower portion 12B that is fluid-connected to the upper or inlet end of the sump means 14, which comprises another generally vertically-arranged hollow cylinder that is also preferably made of stainless steel and, of course, has a smaller diameter than that which form the upper portion 12A of the cooking chamber 12 and which has its bottom end 14B fluid-sealed except for an opening 14C that is fluid-connected to the inlet end of the conduit member 17A which, in turn, has its outlet end fluid-connected to the inlet of the pump means 17.

As best shown in FIGS. 1-5, the support means 13 for locating the food articles 11 within the cooking chamber 12 comprises a multi-tiered, generally cylindrical basket that can be removably inserted into the chamber 12 through the open top end of its upper portion 12A. As illustrated, the support means basket 13 is formed of a plurality of interconnected rods, preferably made of stainless steel that are, of course, spaced apart such that substantially all of the exterior surfaces of the food articles 11 supported thereon will be exposed. As further shown, the support means basket 13 includes a generally cylindrical outer frame 13A, which, when inserted in the cooking chamber 12, will be generally vertically arranged with its bottom edge resting atop the intersection of the bottom of the chamber upper portion 12A and the top of the chamber lower portion 12B, and multiple tiers (four, as illustrated) of open support trays 13B interconnected thereto which will then be vertically spaced apart and generally horizontally arranged and upon which the food articles 11 are supported within the upper portion 12A of the cooking chamber 12. Each of these support trays 13B has a first or upper side and a second or lower side that is opposite to the first or upper side thereof.

As further illustrated, the plural support means trays 13B are vertically spaced apart from one another by a distance sufficient to allow the food articles 11 to be located atop each one and such that the first sprayer means 16A can be located within the cooking chamber 12 adjacent to the first or upper side of each such support means tray 13B and the second sprayer means 16B can be located within the cooking chamber 12 adjacent to the second or lower side of each such support means tray 13B that is opposite from the first side.

As additionally shown, the opposed first and second sprayer means 16A and 16B of the novel apparatus 10 of the present invention comprise plural vertically spaced apart pairs (five, as illustrated) of perforated tubes 16 which are sealed at their outer ends and have their inner ends fluid-connected to the upper portion of the conduit member 17D and extend radially outwardly therefrom to a point just short of the outer periphery of each of the support means trays 13B to which they are respectively adjacently located. Each of these vertically spaced apart pairs of perforated sprayer means tubes 16 are connected to the conduit member 17D such that they are aligned in a common vertical plane with one another. And, that conduit member 17D is vertically arranged along the central axis of the cooking chamber 12, with its lower end being journalled in fluid-tight rotary bearing means 17E mounted at the geometric center of the sealed bottom end 14B of the sump means 14 and fluid-connected to the conduit member 17C through a rotary joint 17F, of a well-known construction, for rotation relative to the cooking chamber 12 and the support means 13 for supporting the food articles 11 therein and is mechanically interconnected to the drive means 18 for causing rotary movement thereof relative to the cooking chamber 12 and the support means 13 with the first and second sprayer means 16A and 16B continuing to remain aligned in a common vertical plane with one another.

As still further illustrated, the pump means 17 preferably comprises a gear-type pump that is driven by an electrically-powered motor 19A through a variable speed gear box 19B which can be selectively adjusted via manual operation of its controller wheel 19C to selectively vary the discharge pressure of the field pumped by the pump means 17 in a range between 10 and 70 p.s.i.g. As noted previously, the pump means 17 has its inlet or suction fluid-connected to the outlet end of the conduit member 17A which, in turn, has its inlet end fluid-connected to the sump means 14 through the opening 14C that is provided in the otherwise fluid-sealed bottom end 14B thereof. And, the outlet or discharge of the pump means 17 is fluid-connected to the inlet end of the conduit member 17B which, in turn, has its outlet end connected to the inlet of a fluid "micro-filter" 20, of a well-known construction. The outlet of the "micro-filter" 20 is fluid-connected to the inlet end of the conduit member 17C which, in turn, as previously described, has its outlet end fluid-connected to the inlet end of the rotatable conduit member 17D through the rotary valve 17F.

As yet further shown, the drive means 18 for causing rotary movement of the sprayer means tube mounting rotatable conduit member 17D comprises another electrically-powered motor 18A that is mechanically connected through another variable speed gear box 18B and a belt 18C and pulleys 18D and 18E to the bottom of that rotatable conduit member 17D. With the illustrated arrangement, the drive means variable speed gear box 18B can be selectively adjusted through manual operation of its hand wheel 18F to selectively vary the speed of rotation of the sprayer tube means mounting rotatable conduit member 17 in a range of between 0 and 180 revolutions per minute (R.P.M.).

As even further illustrated, the heater means 15 for the novel apparatus 10 of the present invention comprises a jacketed electrically-powered heating coil of a well-known type that is mounted within the lower portion of the sump means 14 so as to permit its immersion within the cooking medium to heat the same. It should, however, be most clearly understood that the only intentional immersion of anything within the cooking medium should occur in the sump means 14. Nothing is ever intended to be immersed by the cooking medium in any part of the cooking chamber 12 of the apparatus 10 of the present invention. A centrally apertured screen 21 is removably located around the rotatable conduit member 17D between the bottom end of the frusto-conically shaped lower portion 12B of the cooking chamber 12 and the top end of the sump means 14 in an effort to prevent the entry of gross-sized food article particles or coatings from the outer surfaces of the food articles 11 into the sump means 14.

The food articles 11 are supported by the support means 13 within the upper portion 12A of the cooking chamber 12 and are cooked therein by having a highly pressurized spray of the heated cooking medium directed on them from the perforations provided in the sprayer means tubes 16. The cooking medium is heated in the sump means 14 by the immersed heater means 15 and is pumped from the sump means 14 to the sprayer means tubes 16 under selectively adjustable pressures in a range between 10 and 70 p.s.i.g. by the pump means 17 via the conduit members 17A–D and the rotary joint 17F and is returned by gravity to the sump means 14 from the cooking chamber 12 through the screen 21.

As illustrated, the exteriors of both the cooking chamber 12 and the sump means 14 are covered with a heat-insulative material 22 in order to reduce the loss of heat therefrom. It is further desirable that portions of the pump means 17 and the conduit members 17A-C also be coated, as is practicable, with a heat-insulative material (not shown) for the same reason.

As basically diagrammatically shown in FIG. 1, the electrical heater means 15, the electrically-powered motor 18A for the sprayer tube mounting drive means 18 and the electrically-powered motor 19A for the heated cooking medium pump means 17 are connected in electrical parallel across a common electrical power source that is illustrated as lines $L_1$ and $L_2$, and a normally-open manually-operable "main" electrical switch 23, is provided for simultaneously electrically disconnecting and/or connecting all three respectively from and to the source of electrical power.

As still further basically diagrammatically shown in FIG. 1, one of the two electrical terminals of the electrical heater means 15 is electrically connected to one of the two electrical power lines $L_1$, down-circuit of the "main" switch 23, through a conductor 24 and a manually-operable normally-open electrical switch 25 and the other electrical terminal of the electrical heater means 15 is electrically connected to the other electrical power line $L_2$ through a conductor 26 and a normally-closed thermally-actuatable switch 27. The actuator of this latter switch 27 is connected to and is actuatable by a first temperature-sensing means 27A that is mounted within the lower portion of the sump means 14 to sense the temperature of the cooking medium that is contained therein. The temperature at which the actuator of the switch 27 will be operated to open the switch 27 can selectively manually adjusted by the operator of the novel apparatus 10 of the present invention. When the employed liquid cooking medium is water and the food articles 11 are uncoated chicken parts, this desired temperature is 205° F. It is most desirable that the control means which are comprised by the switch 17 and the temperature-sensing means 27A be capable of controlling the operation (electrical energization and de-energization) of the heater means 15 so as to control the temperature of the cooking medium that is heated thereby to within ± 2° F. of the desired temperature to which the liquid cooking medium is to be heated and maintained by the heater means 15 and to further control the temperature of that cooking medium such that no latent heat of vaporization is supplied thereto by the heater means 15. For this purpose, excellent results have been obtained by employing for the switch 27 and its temperature-sensing actuator means 27A a control means that is sold as Model No. 49-J-800 by Omega Engineering, Inc. of Stamford, Conn., U.S.A.

As yet further basically diagrammatically shown in FIG. 1, one of the two electrical terminals of the electrically-powered motor 18A for the drive means 18 is electrically connected to one of the two electrical power lines $L_1$, down-circuit of the "main" switch 23, through a conductor 28 and a manually-operable normally-open electrical switch 20 and the other electrical terminal of the motor 18A is electrically connected to the other electrical power line $L_2$ through a conductor 30 and a normally-closed thermally-actuatable switch 31. The actuator of this latter switch 31 is connected to and is actuatable by a second temperature-sensing means 32 that is mounted within the upper portion 12A of the cooking chamber 12 and can be inserted into at least one of the food articles 11 supported therein by the support means 13 to sense the interior temperature thereof. The temperature at which the actuator of the switch 31 will be operated to open the switch 31 can be selectively manually adjusted by the operator of the novel apparatus 10 of the present invention.

As even further basically diagrammatically shown in FIG. 1, one of the two electrical terminals of the electrically-powered motor 19A for the pump means 17 is electrically connected to one of the two electrical power lines $L_1$, down-circuit of the "main" switch 23, through a conductor 33 and a manually-operable normally-open electrical switch 34 and the other electrical terminal of the pump means motor 19A is electrically connected to the other electrical power line $L_2$ through a conductor 35 and a normally-closed thermally-actuatable switch 36. The actuator of this last-mentioned switch 36 is also connected to and is actuatable by the aforenoted second or food article temperature-sensing means 32 that is mounted within the upper portion 12A of the cooking chamber 12. And, the temperature at which the actuator of the switch 36 will be operated to open the switch 36 can be selectively manually adjusted by the operator of the novel apparatus 10 of the present invention.

With the aforedescribed arrangement, the two thermally-actuatable switches 31 and 36 and the second temperature-sensing means 32 which operates the actuators of both comprise control means that operate to de-energize both the rotary drive means 18 and the pump means 17 for the sprayer tube means 16 when a desired temperature is sensed and maintained for a desired time period at the center of the food article 11 into which the second temperature-sensing means 32 is inserted. This desired temperature is referred to as the "doneness" temperature of the food article 11. For cooked chicken, this desired "doneness" temperature is 188° F. maintained continuously for a two-minute time duration.

When vegetable oil, animal fat, shortening and the like are employed for the cooking medium in the novel apparatus 10 of the present invention, it has been found to be desirable to place anti-oxidant materials (not shown) atop the bottom of the screen 21 in order to inhibit oxidation of the liquid cooking medium.

OPERATION

To utilize the novel apparatus 10 of the present invention to cook the food articles 11, the opeator first removes the support means 13 from the cooking chamber 12 via the normally-open upper end thereof.

Next, the operator places the chosen liquid cooking medium into the sump means 14 by pouring it therein via the normally-open upper end of the cooking chamber 12 and through the screen 21. Preferably, a sufficient amount of the cooking medium is poured into the sump means to cover the top of the heater means 15, but in no case should the level of the cooking medium be allowed to rise above the top of the sump means 14.

Then, the operator places the food articles 11 atop the plural trays 13B of the multi-tiered support means 13 and re-inserts the food articles-bearing support means 13 into the cooking chamber 12 via the normally-open upper end thereof.

Next, the operator inserts the temperature-sensing means 32 into one of the food articles 11 and, having done so, preferable covers the upper end of the cooking chamber 12 with suitable means, such as a heat-insulated lid 12L (FIG. 1).

Then, the operator manually adjusts the adjustable thermally-actuatable normally-closed electrical switches 27, 31 and 36 to respectively provide the desired "opening" temperatures therefor and manually adjusts the two hand wheels 18F and 19C to respectively provide the desired rotational speed of the sprayer means mounting rotatable conduit member 17D and the desired pressure at which the pump means 17 will cause the cooking medium to be discharged into the cooking chamber upper portion 12A and onto the food articles 11 via the perforations provided in the plural sprayer means tubes 16.

Next, the operator manually closes, first, the three normally-open mechanically operable electrical switches 25, 29 and 34 and, then, the "main" electrical switch 23, thus energizing the heater means 15, pump means 17 and drive means 18.

Once the above steps have been performed by the operator of the novel apparatus 10 of the present invention, the heater means 15 will remain energized until the first temperature-sensing means 27A senses that the desired temperature to which the cooking medium is to be heated has been reached and, then, causes the normally-closed thermally-actuatable adjustable electrical switch 27 to open. That switch 27 will, thereafter, be intermittently re-closed and re-opened by the first temperature-sensing means 27A to cause such intermittent re-energization and de-energization of the heater means 15 as is necessary to maintain the temperature of the cooking medium to within ± 2° F. of that desired. In no case, however, should the heater means 15 be so energized as to provide any latent heat of vaporization to the cooking medium.

Furthermore, once the above steps have been performed by the operator of the novel apparatus 10 of the present invention, the pump means 17 and the drive means 18 will remain energized and the food articles 11 which are supported on each of the trays 13B of the support means 13 will be clamped between the opposed high pressurized sprays of heated liquid cooking medium that are respectively discharged by the rotating, opposed first and second sprayer means 16A and 16B that are respectively located adjacent the opposite sides of each of such trays 13B until the desired "doneness" temperature is sensed by the food article temperature-sensing means 32 is reached and maintained for the desired period of time sufficient to indicate that the food articles 11 are "done" or cooked thereby without being immersed therein. However, when this "doneness" is sensed by the food article temperature-sensing means 32, both of the thermally-actuatable switches 31 and 36 will then be actuated to open and thus de-energize both the pump means 17 and the drive means 18.

And, when this occurs, the "done" or cooked food articles 11 are ready to be removed from the cooking chamber 12 and the operator manually re-opens the "main" electrical switch 23.

Next, the operator manually removes the lid 12L (FIG. 1) to re-open the normally-open upper end of the cooking chamber 12 and withdraws the "done" or cooked food article-bearing support means 13 from the cooking chamber 12 therethrough.

Finally, the operator removes the "done" or cooked food articles 11 from the support means 13, either for immediate service to the consumer or for storage, and re-inserts the now empty support means 13 into the cooking chamber 12 via its normally-open upper end.

As previously noted above, the novel apparatus 10 of the present invention is particularly adapted for cooking chicken parts wherein the cooking medium employed is water. For example, good results have been obtained wherein the cooking medium comprised 2 gallons of water having a starting temperature of 62° F. and the food articles 11 comprised approximately 10 pounds of plural uncoated raw chicken parts, including breasts, thighs, legs, wings and the like, having a starting temperature of 36° F. With these, the operator manually adjusts the switch 27 to have an opening temperature of 205° F. and the switches 31 and 36 to have an opening temperature of 186° F. and the hand wheels 18F and 19C to respectively provide a rotational speed of 60 R.P.M. for the sprayer tube-bearing rotational conduit member 17D and to cause the pump means 17 to provide a 40 p.s.i.g. discharge pressure to the spray of heated water discharged from the perforations provided in those sprayer tubes 16 while circulating 45 gallons per minute of that water between them and the sump means 14. This has caused those food articles 11 to become "done" or cooked within approximately 18 minutes.

As further previously noted above, the novel apparatus 10 of the present invention can be utilized wherein the cooking medium employed is vegetable oil, animal fat, shortening and the like, to cook chicken parts which have had their outer surfaces covered with a coating of a farinanceous material, such as breading, batter, and the like which will also be cooked (browned) thereby. For example, good results have been obtained wherein the cooking medium comprised 2 gallons of a liquid shortening having a starting temperature of 90° F. and the food articles 11 comprised approximately 10 pounds of plural raw chicken parts, including breasts, thighs, legs, wings and the like, having their outer surfaces covered with a flour-based batter and a starting temperature of 36° F. With these, the operator manually adjusts the switch 27 to have an opening temperature of 285° F. and the switches 31 and 36 to have an opening temperature of 186° F. and the hand wheels 18F and 19C to respectively provide a rotational speed of 60 R.P.M. for the sprayer tube-bearing rotational conduit member 17D and to cause the pump means 17 to provide a 10 p.s.i.g. discharge pressure to the spray of heated liquid shortening discharged from the perforations provided in those sprayer tubes 16 while circulating 11 gallons per minute of that shortening between them and the sump means 14. This has caused those food articles 11 to become "done" or cooked within approximately 18 minutes.

As still further previously noted above, the novel apparatus 10 of the present invention can also be utilized wherein the cooking medium employed is water to cook whole vegetables or parts thereof. For example, good results have been obtained wherein the cooking medium comprised 2 gallons of water having a starting temperature of 62° F. and the food articles 11 comprised approximately 10 pounds of whole medium-size raw white potatoes having a starting temperature of 60° F. With these, the operator manually adjusts the switch 27 to have an opening temperature of 208° F. and the switches 31 and 36 to have an opening temperature of 208° F. and the hand wheels 18F and 19C to respectively provide a rotational speed of 120 R.P.M. for the sprayer tube-bearing rotational conduit member 17D and to cause the pump means 17 to provide a 40 p.s.i.g. discharge pressure to the spray of heated water discharged from the perforations provided in those sprayer tubes 16 while circulating 45 gallons per minute of that water between them and the sump means 14.

This has caused those food articles 11 to become "done" or cooked within approximately 18 minutes.

As yet further previously noted above, the novel apparatus 10 of the present invention can also be utilized wherein the cooking medium employed is water to cook other meat parts besides chicken parts. For example, good results have been obtained wherein the cooking medium comprised 2 gallons of water having a starting temperature of 62° F. and the food articles 11 comprised approximately 10 pounds of plural uncoated pork ribs having a starting temperature of 36° F. With these, the operator manually adjusts the switch 27 to have an opening temperature of 185° F. and the switches 31 and 36 to have an opening temperature of 175° F. and the hand wheels 18F and 19C to respectively provide a rotational speed of 60 R.P.M. for the sprayer tube-bearing rotational conduit member 17D and to cause the pump means 17 to provide a 40 p.s.i.g. discharge pressure to the spray of heated water discharged from the perforations provided in those sprayer tubes 16 while circulating 45 gallons per minute of that water between them and the sump means 14. This has caused those food articles 11 to become "done" or cooked within approximately 8 minutes.

Since no latent heat of vaporization need be supplied to the liquid cooking medium in employing the novel apparatus 10 of the present invention, the energy savings realized by its use are manifest. For example, by employing heated water as its liquid cooking medium, rather than steam as was often required to produce a cooking time of an even longer duration with the aforenoted prior-art apparatus, the novel apparatus 10 of the present invention can save the 970 BTU per pound that is required to change 212° F. water into steam. With the novel apparatus 10 of the present invention, the only energy that is required to heat the water is the 1 BTU per 1° F. per pound thereof needed to raise it from its tap temperature (typically 62° F.) to the desired temperature for cooking the food articles 11 (about 200° F. for chicken parts) and to maintain it there.

Additional savings, both in energy and in the required amount of liquid cooking medium can be realized by using the novel apparatus 10 of the present invention as opposed to the aforenoted prior-art "immersion-type" apparatus, in that its cooking is accomplished by circulating and spraying only a small fraction of the amount of the liquid cooking medium that was required by these old prior-art "immersion-type" cooking apparatus. This, of course, greatly reduces the number of pounds of the cooking medium which must be heated and, consequently, also greatly induces both the energy required for such heating and the cost of the required cooking medium itself. The savings permitted by the reduction in the amount of the required cooking medium is, in itself, of considerable value when vegetable oils, animal fats, and shortening are employed as the liquid cooking medium since there is also a mounting demand for them and diminishing supplies thereof (and, consequently, rising cost therefor).

Furthermore, when fat-containing food articles, such as chicken parts and other meat parts, comprise the food articles 11 to be cooked, the high-pressure spraying of the liquid cooking medium onto the food articles 11 that is permitted by the unique construction of the novel apparatus 10 of the present invention actually serves to considerably increase the amounts of animal fats that are extracted from those food articles during the cooking process, when compared to the aforenoted prior-art apparatus.

It should be apparent to those skilled in the art that while there has been described what presently is considered to be a presently preferred embodiment of this invention in accordance with the Patent Statutes, changes may be made in the disclosed apparatus without actually departing from the true spirit and scope of this invention. It is therefore intended that the appended claims shall cover such modifications and applications that may not depart from the true spirit and scope of the present invention.

What is claimed is:

1. A method of cooking food articles comprising the steps of:
   (a) disposing said articles in a space on support means such that substantially the entire surface of each article is exposed,
   (b) directing sprays of a liquid cooking medium, maintained by heater means at a temperature below that at which said sprays of liquid cooking medium will receive any latent heat of vaporization therefrom, against said articles at a discharge pressure of from about 10 to 70 p.s.i.g. and at a preselected cooking temperature without said articles being immersed in said cooking medium, said sprays being directed simultaneously and aligned in a common plane with one another against opposed sides of each article while maintaining relative movement between said sprays and said support means such that each article is clamped between the pressurized sprays of liquid cooking medium and substantially the entire surface of each article is contacted by said medium, and
   (c) continuing said spraying until said food articles are cooked.

2. In the method according to claim 1, using as said cooking medium a material selected from the group consisting of water, vegetable oil, animal fat and liquid shortening.

3. In the method according to claim 2, disposing uncoated chicken parts in said space on said support means, spraying water into said space against said uncoated chicken parts and maintaining said water at a temperature of about 205° F.

4. In the method according to claim 2, recovering said cooking medium from said space after said cooking medium has been sprayed against said food articles, reheating said medium to said preselected temperature and then recycling it to said space for spraying.

5. In the method according to claim 2, wherein said food articles comprise chicken parts having their outer surfaces covered with a coating of a farinaceous material and said cooking medium is a material selected from the group consisting of vegetable oil, animal fat and liquid shortening.

6. In the method according to claim 5, recovering said cooking medium from said space after said cooking medium has been sprayed against said food articles, removing solids from said recovered medium, reheating said medium to said preselected temperature and then recycling it to said space for spraying.

7. In the method of claim 5, using as said cooking medium liquid shortening and maintaining said liquid shortening at a temperature of about 285° F.

* * * * *